United States Patent
Macklyn

[11] 3,882,604
[45] May 13, 1975

[54] SPLINE MEASURING UNIT
[75] Inventor: Bruce A. Macklyn, Detroit, Mich.
[73] Assignee: Zero Gage Company, Detroit, Mich.
[22] Filed: Mar. 7, 1973
[21] Appl. No.: 338,958

[52] U.S. Cl. .......................... 33/147 K; 33/DIG. 14
[51] Int. Cl. ............................................. G01b 5/12
[58] Field of Search .......... 33/147 K, 178 R, 174 Q, 33/143 F, DIG. 14

[56] References Cited
UNITED STATES PATENTS

| 2,547,364 | 4/1951 | Boat | 33/178 R |
| 2,721,392 | 10/1955 | Barrett | 33/178 R |
| 3,209,460 | 10/1965 | Eisele | 33/174 Q |
| 3,254,415 | 6/1966 | Eisele | 33/174 Q |

FOREIGN PATENTS OR APPLICATIONS

| 318,494 | 11/1930 | United Kingdom | 33/143 |

*Primary Examiner*—Richard E. Aegerter
*Assistant Examiner*—Willis Little

[57] ABSTRACT

For measuring the accuracy of either an internal or external spline, this spline measuring unit has two co-axial spherical-ended pins mounted in a gauge unit head, one pin being fixed and the other pin being reciprocable transversely to the axis of a stem. In the internal spline gauge the pins have their spherical ends pointing away from one another and operatively connected through transverse-to-longitudinal motion-converting mechanism to a conventional dial indicator, which shows on a graduated circular dial the amount of motion of the movable pin. In the external spline gauge, the fixed and movable measuring pins have their spherical ends pointing toward one another. Each such unit is so constructed as to measure a predetermined range of spline sizes. A set of such units, each constructed to measure a different range of sizes of splines, and having the same stem sizes to fit the same dial indicator holder socket, covers all sizes of splines within the desired range.

5 Claims, 11 Drawing Figures

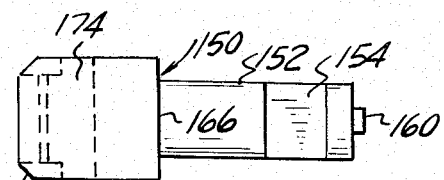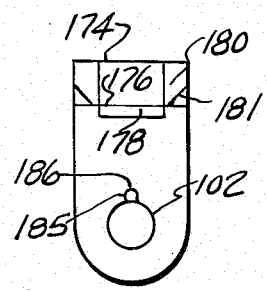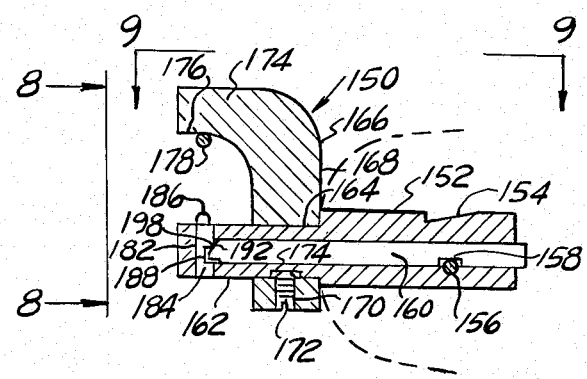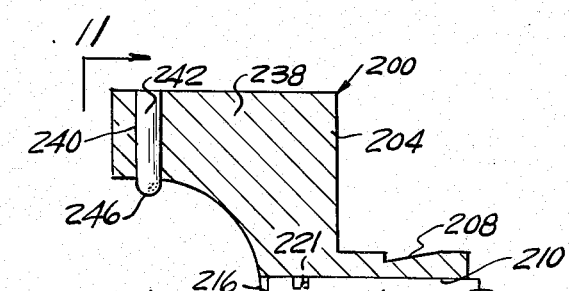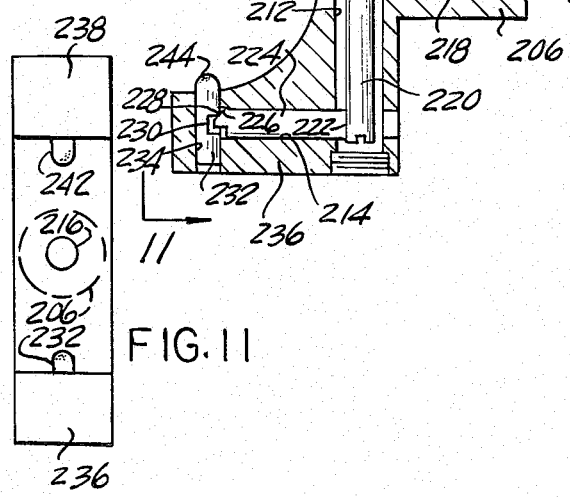

3,882,604

1

SPLINE MEASURING UNIT

BACKGROUND OF THE INVENTION

Hitherto, the measurement of internal splines has been made by inserting and holding precision steel pins of known diameters in the spline grooves (FIG. 5 for an even number of splines, FIG. 6 for an odd number thereof). Johanssen blocks were then built up in the interval between the pins until the stack of such blocks snugly fits the space between the pins. From the sum total of the dimensions of the blocks and the diameters of the gauging pins, the dimensions of the spline can be accurately determined. This procedure, however, is time-consuming but has been hitherto used for checking the initial setup of the broaching machine as well as for checking the broach for wear from time to time as it produces the splines.

SUMMARY OF THE INVENTION

The present spline measuring unit enables the rapid and precise measurement of internal and external splines without resort to the tedious, intricate and time-consuming procedures employed by the use of gauge pins and precision blocks. It enables such measurements to be indicated immediately upon the dial indicator employed in conjunction with the spline measuring unit.

In the drawings,

FIG. 7 is a central vertical section through an external spline measuring unit for the measurement of external splines adapted to be mounted in a conventional dial indicator holder similar to that shown in FIG. 2;

FIG. 8 is a left-hand end elevation of the external spline measuring unit shown in FIG. 7, looking in the direction of the arrows 8—8 therein;

FIG. 9 is a top plan view of the external spline measuring unit shown in FIG. 7;

FIG. 10 is a central vertical section through a modified external spline measuring unit, adapted to be mounted in a conventional dial indicator holder similar to that shown in FIG. 2; and FIG. 11 is a left-hand end elevation of the external spline measuring unit shown in FIG. 10, looking in the direction of the arrows 11—11 therein.

Figure 2:
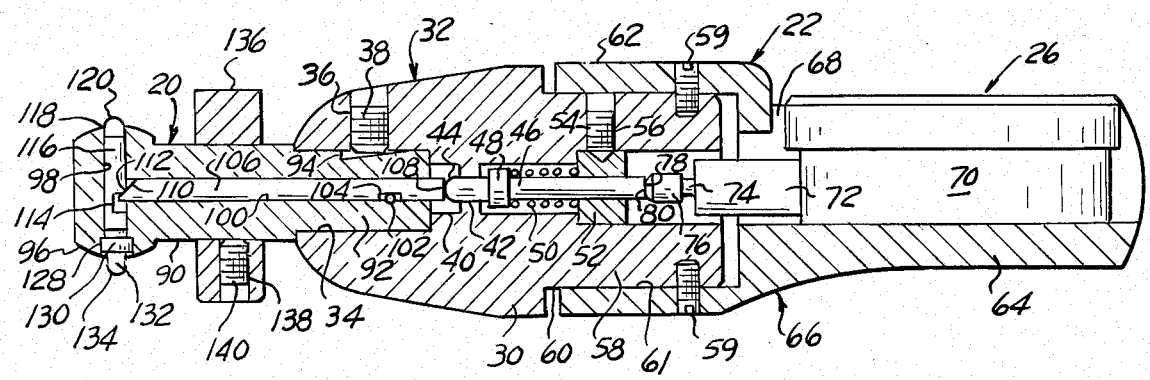
FIG. 2 is a longitudinal section, taken along the line 2—2 in FIG. 1, with the dial indicator shown in side elevation.
Figure 1:
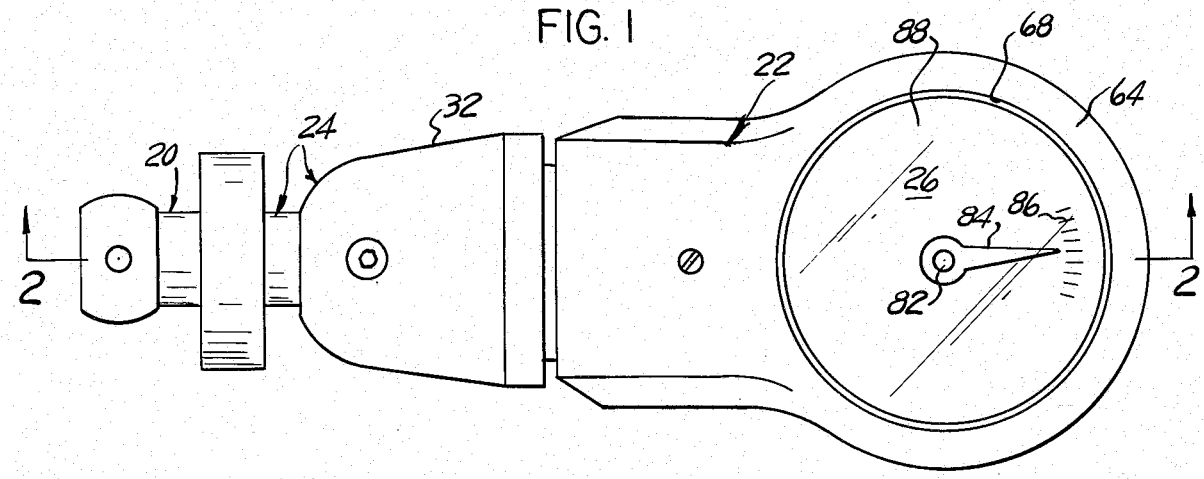
FIG. 1 is a top plan view of an internal spline measuring unit, according to one form of the invention, as mounted in a conventional dial indicator holder.
Figure 3:
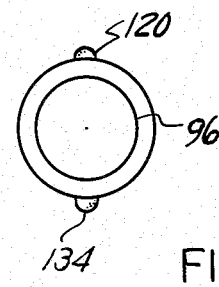
FIG. 3 is a left-hand end elevation of the dial internal spline measuring unit shown in FIGS. 1 and 2.

Referring to the drawings in detail, FIGS. 1 to 4 inclusive show an internal spline measuring unit, generally designated 20, according to one form of the invention, as mounted in a conventional dial indicator gauge unit holder, generally designated 22, to form a dial indicator internal spline measuring guage, generally designated 24, employing a conventional dial indicator, generally designated 26.

The dial indicator gauge unit holder 22 consists of an elongated body 30 with a tapered forward handle 32 containing a cylindrical socket 34 and a transverse threaded bore 36 adapted to receive a headless set screw 38. The socket 34 receives the internal spline measuring unit 20, as described more fully below. The socket 34 at its rearward end opens into a stepped bore 40 having a partition wall 42 therein slidably receiving the forward portion of a rearward motion-transmitting rod 46 having a rounded forward end 44 and provided with an enlargement or collar 48 against which presses the forward end of a compression spring 50. The rearward end of the spring 50 abuts the forward end of a bushing 52 seated in the rearward portion of the stepped bore 40 and drilled coaxial with the stepped bore 40 to slidably receive the rearward portion of the rearward motion-transmitting rod 46. The bushing 52 is held in place by a headless set screw 54 threaded into a transverse bore 56 in a reduced diameter rearward end portion 58 of the body 30 provided with a cylindrical outer surface 60.

The forward handle 32 has a reduced diameter rearward portion 58 secured by headless screws within the cylindrical socket 61 of a suitably drilled forwardly extending skirt 62 integral with the rearward portion 64 of a dial indicator support 66. The latter is provided with a substantially cylindrical recess 68 adapted to receive the casing 70 of the dial indicator 26, which has a tubular stem 72 in which is slidably mounted its reciprocable operating plunger 74. The plunger 74 terminates in an enlarged head 76 having a rounded forward end 78 which is urged into engagement with the flat rearward end 80 of the motion-transmitting rod 44 by a compression spring (not shown) within the dial indicator casing 70. The dial indicator 26 is conventional and its details are well known to those skilled in the precision measurement instrument art. It will suffice to state, for the purposes of the present disclosure, that the dial indicator plunger 74 is connected through a gear train (not shown) within the casing 70 to a transverse spindle 82 journaled in the casing 70 and having mounted thereon a pointer or needle 84 registering with a graduated annular scale 86, on a dial 88.

The internal spline measuring unit 20 consists of an elongated stem 90 (FIG. 2) having at its rearward end a reduced diameter portion 92 provided with an inclined notch 94 which receives the inner end of the headless set screw 38 when the reduced diameter portion 92 is seated in the socket 34 within the forward handle 32. The forward end of the stem 90 terminates in an enlarged partially spherical head 96 having a transverse bore 98 therein communicating with a longitudinal bore 100 within the stem 90. The rearward portion 92 of the stem 90 is drilled transversely for the reception of a pin 102 which relatively slidably engages the bottom of a rectangular rotation-preventing notch 104 in a forward motion-transmitting rod 106 slidably mounted in the bore 100. The flat rearward end 108 of the rod 106 engages the spherical forward end 44 of the rearward motion-transmitting rod 46 of the dial indicator support 22.

Figure 4:
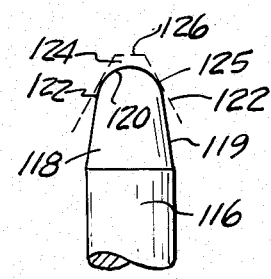
FIG. 4 is an enlarged side elevation of the end portion of a spline pin employed in the gauge unit of the present invention, shown in its position with its spherical end or tip engaging the converging side wall surfaces of an internal spline.
Figure 5:
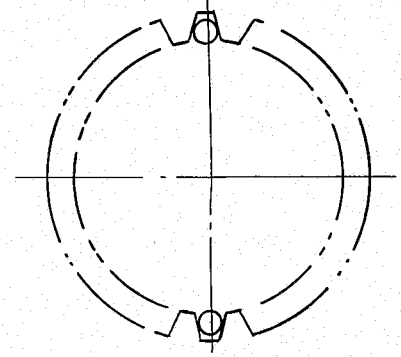
FIG. 5 is a diagrammatic view showing the prior art internal spline measurement by the use of precision measuring pins seated in the diametrically opposing V-grooves of an internal spline with an even number of splines.
Figure 6:
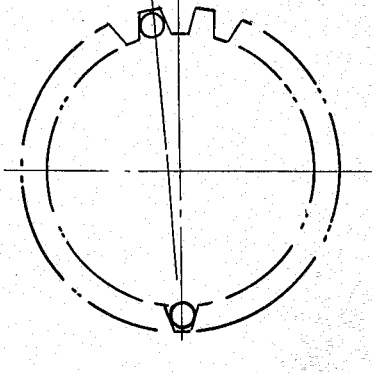
FIG. 6 is a view showing the prior art internal spline measurement similar to FIG. 5, but with the pins seated in the opposite grooves of an internal spline with an odd number of splines, so that the line of centers of the pins is disposed at an acute angle to the spline diameter drawn through the center of one of the pins.

The forward end 110 of the forward motion-transmitting rod 106 is inclined relatively to the axis of the rod 106 and its bore 100 at an angle of 45° and engages a correspondingly inclined flat surface 112 across one corner edge of a rectangular notch 114 in a movable spline-measuring pin 116. The latter is reciprocably mounted in the transverse bore 98 and has a tapered forward end 118 terminating in a substantially hemispherical tip 120 (FIG. 4). The tapered portion 119 of the tapered forward end 118 (FIG. 4) is provided with an angle of taper sufficient to provide clearance with the opposite side surfaces 122 of the spline groove 124 when the substantially hemispherical tip 120 is tangent thereto at 125 during measurement. The substantially hemispherical tip 120 is made of sufficient radius to clear the bottom surface 126 of the spline groove 124 when the spherical surface 120 is tangent to the flat sides 122 of the spline groove 124.

The end of the transverse bore 98 opposite the spherical end surface 120 is counterbored at 128 (FIG. 1) to receive the enlarged base 130 of a fixed measuring pin 132 having a tapered end with a spherically rounded tip 134 similar in configuration to the tapered forward end 118 of the movable measuring pin 116. Slidably mounted on the stem 90 is a depth stop collar 136 drilled and threaded at 138 to receive a headless set screw 140 for clamping it in any desired position in order to establish the depth at which the internal spline measurement takes place.

In assembling the internal spline measuring unit 20, the reduced diameter portion 92 of the stem 90 is inserted in the socket 34 of the forward handle 32 of the elongated body 30 and rotated until its notch 94 is aligned with the clamping set screw 38, which is then tightened by a so-called Allen wrench of hexagonal cross-section inserted in the correspondingly hexagonal socket (not shown) in the outer end of the set screw 38. The operator also adjusts the depth stop collar 136 by sliding it along the stem 90 until it is correctly located for the desired depth of measurement corresponding to the distance between it and the movable measuring pin 116, whereupon the set screw 140 is tightened in the same manner as the set screw 38.

The operator then inserts the spherical head 96 of the unit 20 into the internal spline to be measured until it is halted by the depth stop collar 126, whereupon the substantially hemispherical tips 120 and 134 of the movable and fixed measuring pins 116 and 132 engage the inclined flat sides 122 of the opposing spline grooves 124, and the movable measuring pin 116 is pushed inward. This transverse motion of the movable measuring pin 116 is transmitted by the sliding engagement between the inclined surfaces 112 and 110 and converted into longitudinal motion of the forward and rearward motion-transmitting rods 106 and 46 so as to move the dial indicator plunger 74, and consequently to cause the dial indicator needle 84 to indicate on the graduated scale 86 the diameter of the internal spline grooves 124 at the points of tangency 125.

The external spline measuring unit, generally designated 150, shown in FIGS. 7 to 9 inclusive, consists of an elongated stem 152 having an inclined notch 154 near the rearward end thereof (FIG. 7) for the same purpose of being engaged by the clamping set screw 38 in the socket 34 in the forward handle 32 of the dial indicator gauge unit holder 22 (FIG. 2). The rearward portion of the stem 152 is also drilled transversely to receive a pin 156 which relatively slidably engages the bottom of a rectangular rotation-preventing notch 158 in one side of a forward motion-transmitting rod 160. The reduced diameter forward portion 162 of the stem 152 is seated in a bore 164 of corresponding diameter in an angle arm 166. The inner portion 168 of the angle arm 166 is drilled and threaded at 170 to receive a headless set screw 172 which engages the bottom of a flat-bottomed notch 174 in the said reduced diameter portion 162 of the stem 152. The outer end portion 174 of the angle arm 166 on its lower side is provided with a flat transverse surface 176 disposed parallel to the axis of the forward motion-transmitting rod 160. Mounted upon and fixedly secured to the surface 176 is an elongated cylindrical measuring pin 178, disposed transversely to the axis of the forward motion-transmitting rod 160. The outer end portion 174 is provided with 45° chamfers 180 and 181. A bore 182 in the forward end of the reduced diameter portion 162 of the stem 152 is drilled with its axis perpendicular to the axis of the fixed cylindrical pin 178. Slidably mounted in the bore 182 is a movable measuring pin 184 having on its reduced diameter end portion 185 facing the pin 178 a substantially hemispherical tip 186. The movable measuring pin 184 intermediate its opposite ends is provided with a rectangular notch 188, a 45° inclined corner edge 190 of which is engaged by the correspondingly-inclined end 192 of the forward motion-transmitting rod 160.

The external spline measuring unit 150, prior to being operated, is inserted in the socket 34 in the rotary forward handle 32 of the dial indicator holder 22 in the same manner as described above for the internal spline measuring unit 20. To perform an external spline measurement, the measuring pins 178 and 186 are pushed into the spline grooves of the external spline, whereupon the movable pin 184 is pushed inward and its transverse motion is converted to longitudinal motion of the forward motion-transmitting rod 160 by the coacting inclined surfaces 190 and 192. The consequent longitudinal motions of the rearward motion-transmitting rod 46 and dial indicator plunger 74 are converted into rotary motion of the dial indicator spindle 82 and swinging motion of the needle or pointer 84 by the internal mechanism of the dial indicator 26 to indicate the measurement upon the graduated circular scale 86 in the manner described above in connection with the operation of the internal spline measuring unit 20.

The modified external spline measuring unit, generally designated 200, shown in FIGS. 10 and 11 consists of a body 202 including an approximately C-shaped head structure 204 from which a stem 206 containing an inclined notch 208 projects rearwardly. The stem 206 is snugly received within the socket 34 in the rotary forward handle 32 and locked in place by the set screw 38 engaging the bottom of the inclined notch 208. The stem 206 has a longitudinal central bore 210 therethrough which communicates with an enlarged transverse intermediate bore 212. The latter in turn communicates with an offset longitudinal outer bore 214 disposed in spaced parallel relationship to the stem bore 210. Slidably mounted in the bores 210 and 214 and movable back and forth in the enlarged bore 212 is a forward motion-transmitting rod structure, generally designated 216. The latter consists of a central rod 218 having a flat rearward end 219 adapted to engage the rounded forward end 44 (FIG. 2) of the rearward motion-transmitting rod 46 of the dial indicator holder 22. The central rod 218 near its forward end is transversely drilled and threaded to receive the reduced-diameter correspondingly-threaded inner end portion 221 of an intermediate rod 220. The intermediate rod 220 at its outer end abuts the rearward end 222 of an outer motion-transmitting rod 224, the forward end of which has an inclined surface 226 which is disposed at an angle of 45° to the axis of the bore 214 and which engages the correspondingly inclined corner edge 228 of a rectangular slot 230 in a movable measuring member 232 slidably mounted in a transverse bore 234, the axis of which is disposed perpendicular to the axis of the central bore 210. The axis of the outer bore 214 is disposed parallel to the axis of the central bore 210.

The movable measuring member 232 and its bore 234 together with the bore 214 and rod 224 are disposed in an arm 236 of the C-shaped head structure. The opposite arm 238 of the head structure 204 is provided with a bore 240 coaxial with the bore 234. Seated in the bore 240 is a stationary measuring member 242. The movable and stationary measuring members 232 and 242 have substantially hemispherical tips 244 and 246 respectively adapted to fit into and tangentially engage the inclined side walls of the external spline groove which the unit 200 is intended to measure.

In the operation of the modified external spline measuring unit 200, the stem 206 is mounted in the socket 34 of the nose portion 32 of the rotary-handle dial indicator holder 22 in the manner described above in connection with FIGS. 1, 2 and 7 and locked in position by tightening the headless set screw 38 against the bottom of the inclined notch 208 (FIGS. 2 and 11). The operator then grasps the rearward portion 64 of the dial indicator carrier 66 with one hand and the tapered nose portion or rotary handle 32 with the other hand and pushes the head structure 204 toward the external spline to be measured, at the same time aligning the substantially hemispherical ended tips 244 and 246 of the measuring pins 232 and 242 with the opposite spline grooves into which he pushes the tips 244 and 246. The substantially hemispherical tips 244 and 246 then engage the inclined side surfaces of the spline grooves tangentially. Meanwhile, the forward motion-transmitting rod structure 216 is urged in a forward direction by the compression coil spring 50 (FIG. 2) as a result of its urging the rearward motion-transmitting rod 46 in a forward direction. The dial indicator plunger 74 is also urged in an outward or forward direction relatively to its stem 72 by a spring (not shown) within the casing 70 of the dial indicator 26.

As the movable measuring pin 232 moves outward as a result of the engagement of its substantially hemispherical tip 244 with the inclined side surface of the particular spline groove in which it is in contact, the inclined corner 228 of the notch 230 slidably engages the correspondingly-inclined forward end 226 of the outer motion-transmitting rod 224, moving it rearwardly in its bore 214 so that its rearward end 222 pushes the intermediate motion-transmitting rod 220 rearwardly across the enlarged bore 212. The threaded connection of the reduced diameter end portion 221 with the central motion-transmitting rod 218 transmits thereto the longitudinal motion of the outer motion-transmitting rod 224 by way of the intermediate motion-transmitting rod 220. As a result, the rearward end 219 of the central motion-transmitting rod 218 engages the rounded end 44 (FIG. 2) of the rearward motion-transmitting rod 46 and moves it rearwardly against the urge of the compression coil spring 50, whereupon the flat rearward end 80 of the rearward motion-transmitting rod 46 transmits its motion to the spherical end 78 of the dial indicator plunger 74. As a result, the longitudinal motion of the dial indicator plunger 74 is transmitted through its internal mechanism and converted thereby to rotary motion of the spindle 82 and needle or pointer 84 (FIG. 1) which in turn indicates on the circular graduated scale 86 the spline measurement which has been thus obtained.

I claim:

1. A spline or broach diameter measuring unit adapted for insertion in the socket of a conventional dial indicator gauge holder containing a dial indicator with a reciprocable operating plunger and a reciprocable rearward motion-transmitting member operatively engageable with said plunger, said unit comprising a hollow stem having a rearward portion configured to fit said socket and having a longitudinal bore therein, a laterally-enlarged head structure on the forward end of said stem having a transverse bore therein communicating with said longitudinal bore, a fixed measuring member stationarily mounted on said head coaxial with said transverse bore, a movable measuring member slidably mounted in said transverse bore for motion toward and away from said fixed measuring member, a forward motion-transmitting device slidably mounted in said longitudinal bore and adapted to operatively engage the rearward motion-transmitting member of the dial indicator gauge holder, and motion-converting mechanism operatively connecting said movable measuring member to said forward motion-transmitting device and adapted to convert transverse motion of said movable measuring member into longitudinal motion of said forward motion-transmitting device, said transverse measuring members having substantially hemispherical tips adapted to engage the inclined side surfaces of the spline grooves, said measuring members having body portions disposed within said head structure and having tapered clearance portions cut away to avoid contact thereof with the spline and connecting said body portions to said substantially hemispherical tips.

2. A spline or broach diameter measuring unit adapted for insertion in the socket of a conventional dial indicator gauge holder containing a dial indicator with a reciprocable operating plunger and a reciprocable rearward motion-transmitting member operatively engageable with said plunger, said unit comprising a hollow stem having a rearward portion configured to fit said socket and having a longitudinal bore therein, a laterally-enlarged head structure on the forward end of said stem having a transverse bore therein communicating with said longitudinal bore,
a fixed measuring member stationarily mounted on said head coaxial with said transverse bore,
a movable measuring member slidably mounted in said transverse bore for motion toward and away from said fixed measuring member,
a forward motion-transmitting device slidably mounted in said longitudinal bore and adapted to operatively engage the rearward motion-transmitting member of the dial indicator gauge holder,
and motion-converting mechanism operatively connecting said movable measuring member to said forward motion-transmitting device and adapted to convert transverse motion of said movable measuring member into longitudinal motion of said forward motion-transmitting device,
said transverse measuring members having substantially hemispherical tips adapted to engage the inclined side surfaces of the spline grooves,
said head structure including an approximately L-shaped arm having an inner end portion secured to said hollow stem,
said fixed measuring member being stationarily mounted on the outer end portion of said arm.

3. A measuring unit, according to claim 2, wherein said stem has a reduced diameter forward portion with a shoulder disposed at the rearward end thereof, wherein said one end portion of said arm has a bore therethrough coaxial with said longitudinal bore of said stem and slidably receives said reduced diameter forward portion of said stem with said one end portion abuttingly engaging said shoulder.

4. A measuring unit, according to claim 2, wherein said head structure includes an approximately C-shaped body with said stem projecting substantially radially from the approximate mid-portion of said body and with a pair of arms extending outward in opposite directions away from said stem, wherein said fixed measuring member is stationarily mounted on the outer end portion of one of said arms, and wherein said transverse bore is disposed in the outer end portion of the other of said arms coaxial with said fixed measuring member.

5. A spline or spline broach diameter measuring unit adapted for insertion in the socket of a conventional dial indicator gauge holder containing a dial indicator with a reciprocable operating plunger and a reciprocable rearward motion-transmitting member operatively engageable with said plunger, said unit comprising
a hollow stem having a rearward portion configured to fit said socket and having a longitudinal bore therein,
a laterally-enlarged head structure on the forward end of said stem having a transverse bore therein communicating with said longitudinal bore,
a fixed measuring member stationarily mounted on said head coaxial with said transverse bore,
a movable measuring member slidably mounted in said transverse bore for motion toward and away from said fixed measuring member,
a forward motion-transmitting device slidably mounted in said longitudinal bore and adapted to operatively engage the rearward motion-transmitting member of the dial indicator gauge holder,
and motion-converting mechanism operatively connecting said movable measuring member to said forward motion-transmitting device and adapted to convert transverse motion of said movable measuring member into longitudinal motion of said forward motion-transmitting device,
said transverse measuring members having spherically-surfaced tips adapted to engage the inclined side surfaces of the spline grooves,
said head structure including an approximately C-shaped body with a pair of arms extending outward in opposite directions away from said stem,
said fixed measuring member being stationarily mounted on the outer end portion of one of said arms,
said transverse bore being disposed in the outer end portion of the other of said arms coaxial with said fixed measuring member,
said motion-transmitting device including a central motion-transmitting member slidably mounted in said longitudinal bore of said stem,
said other arm having an outer bore in the outer end portion thereof disposed parallel to the axis of said longitudinal stem bore,
a transverse passageway interconnecting said bores,
said forward motion-transmitting device including a central motion-transmitting member slidably mounted in said longitudinal bore of said stem,
said forward motion-transmitting device further including an intermediate motion-transmitting member fixedly secured to said central motion-transmitting member with its axis substantially perpendicular thereto,
said forward motion-transmitting device still further including an outer motion-transmitting member with its rearward end abuttingly engaging said intermediate motion-transmitting member and with its forward end operatively connected to said motion-converting device.

* * * * *